US012752890B2

(12) United States Patent
Robertson et al.

(10) Patent No.: US 12,752,890 B2
(45) Date of Patent: Oct. 6, 2026

(54) METHOD OF OPERATING A MARINE LIGHTING SYSTEM

(71) Applicant: Ocean LED Marine Limited, Hinckley (GB)

(72) Inventors: Toby Robertson, Hinckley (GB); Daniele Todaro, Hinckley (GB)

(73) Assignee: Ocean LED Marine Limited, Hinckley (GB)

( * ) Notice: Subject to any disclaimer, the term of this patent is extended or adjusted under 35 U.S.C. 154(b) by 68 days.

(21) Appl. No.: 18/673,552

(22) Filed: May 24, 2024

(65) Prior Publication Data

US 2024/0391569 A1 Nov. 28, 2024

(30) Foreign Application Priority Data

May 26, 2023 (GB) ..................................... 2307945

(51) Int. Cl.

*B63B 45/04* (2006.01)
*B63B 39/14* (2006.01)
*F21S 43/00* (2018.01)
*F21V 23/04* (2006.01)

(52) U.S. Cl.

CPC .............. *B63B 45/04* (2013.01); *B63B 39/14* (2013.01); *F21S 43/601* (2024.05); *F21V 23/0492* (2013.01)

(58) Field of Classification Search

CPC ......... B63B 45/04; B63B 39/14; B63B 45/06; B63B 45/00; F21S 43/601; F21V 23/0492; H05B 47/105

See application file for complete search history.

(56) References Cited

U.S. PATENT DOCUMENTS 7,525,254 B2 * 4/2009 Lys ...................... B60Q 1/2696 315/77
2007/0091609 A1 * 4/2007 Solberg ................... B63B 45/02 362/287
2019/0090327 A1 * 3/2019 Zolotykh ............. H05B 47/105
2021/0371064 A1 * 12/2021 Boks ....................... B63B 21/04
2022/0107415 A1 * 4/2022 Remelius ............. A61B 5/6826

FOREIGN PATENT DOCUMENTS

AU 2019100784 A4 8/2019
CN 115950438 A * 4/2023
EP 4514071 A1 * 2/2025 ............. B60K 35/81

OTHER PUBLICATIONS

English Translation of CN-115950438-A, Zeng, Xu-ming (Year: 2023).*
English Translation of EP-4514071-A1, Li, Huayu (Year: 2025).*
UKIPO, Combined Search and Examination Report for corresponding United Kingdom Patent Application No. GB2307945.2, dated Oct. 12, 2023, 2 pages.

* cited by examiner

*Primary Examiner* — Kito R Robinson
*Assistant Examiner* — Kevin Jerome Harvey, II
(74) *Attorney, Agent, or Firm* — NK Patent Law

(57) ABSTRACT

The present invention provides a marine lighting system and a method of operating the system of the present invention. The system comprises a controller, at least one light and a motion detector operable to detect the pitch and roll of a vessel. The operation of the at least one light is controlled by the controller on the basis of pitch and/or roll of the vessel detected by the motion detector such that the illumination of the at least one light is based on the roll and/or pitch of the vessel.

14 Claims, 1 Drawing Sheet

METHOD OF OPERATING A MARINE LIGHTING SYSTEM

CROSS-REFERENCE TO RELATED APPLICATIONS

This application claims priority to United Kingdom Patent Application No. 2307945.2, filed on May 26, 2023, the entire content of which is incorporated by reference herein.

FIELD OF INVENTION

The present invention relates to marine lighting. In particular, the use of lights mounted in or on marine vessels.

BACKGROUND TO THE INVENTION

Lights are mounted in or on marine vessels to illuminate the vessel and/or the surrounding area. These lights include above water lights and below water lights. Below water lights are generally mounted on the hull of a vessel, through the hull of a vessel, or in cofferdams or equivalent structures formed in the hull of a vessel and point outwards from the hull to illuminate water around the vessel. Above water lights are more varied and include standard lighting fixtures to illuminate areas of the vessel, safety lighting, and decorative lighting to illuminate the vessel.

The movement of marine vessels is more complex than the movement of land-based vehicles due to the movement of the water on which they floating. A marine vessel on water moves in six degrees of motion: three degrees of linear motion along notional x, y, and z axes (surge, sway, and heave) and three degrees of rotational motion about the same notional x, y, and z axes (roll, pitch, and yaw). These degrees of motion are shown in FIG. 1. The surge axis 2, the sway axis 3, and the heave axis 4 are indicated in the Figure. Rotational movement about the surge axis 2 is roll 5. Rotational movement about the sway axis 3 is pitch 6. Rotational movement about the heave axis 4 is yaw 7. Generally, when at sea or in turbulent waters most marine vessels will experience significant roll 5 and pitch 6 but relatively little yaw 7.

The lighting of marine vessels, particularly on leisure vessels, can be controlled to provide decorative displays. For example, lights may be controlled to cycle on and off, to dim and brighten, and/or to vary colour. This is often, although not exclusively, done with underwater lights. The control of the lights is often done according to preset programs and implemented by a controller that acts to control the lights.

There is a desire for improved systems and methods for controlling the lighting of marine vessels that provides improved visual feedback.

SUMMARY OF THE INVENTION

The present invention provides marine vessel lighting system according to claims 1 and 2.

A system of the present invention comprises a controller, a motion detector capable of detecting the roll and/or pitch of a marine vessel, and at least one light that is operated by the controller on the basis of the detected roll and pitch of the marine vessel. The system of the present invention is advantageous in that, compared to lights according to the prior art, it facilitates the operation of lights on marine vessels to coincide with the roll and/or pitch of a marine vessel, providing the capability to provide enhanced lighting effects.

The or each light of the present invention may be any light suitable for use on or in a marine vessel. For example, a light may be any suitable type of underwater light for mounting on, in, or through a hull of a marine vessel. Additionally or alternatively a light may be an above-water light, such as an external or internal light on a marine vessel.

In embodiments of the invention the lighting system may be a self-contained unit comprising the controller, a light and the motion detector. Alternatively, the lighting system may comprise a plurality of lights and a single controller operating each of the plurality of lights.

Advantageously there will be a motion detector provided for each light if the system comprises a plurality of lights. This is advantageous as it allows the motion detectors to be utilized to determine the orientation of each light. However, in embodiments of the system of the present invention there may only one motion detector or fewer motion detectors than the number of lights. The skilled person may determine the appropriate number of motion detectors for any embodiment of the present invention.

The motion detector of the present invention may be any suitable detector that is capable of detecting the roll and/or pitch of a marine vessel on which the system is being utilized. In embodiments of the present invention the or each motion detector may consist of one or more accelerometers.

As set out above, the system of the present invention can be used to control the operation of the one or more lights when roll and/or pitch of the marine vessel are detected. The or each light of the system may be any light that can be controlled by the controller in reaction to the roll and/or pitch of a marine vessel. The or each light may be any light that can be controlled. The control of the light may be switching the light on and off and/or increasing or decreasing the intensity of the light and/or varying the colour of the light. The or each light may either be monochromatic or capable of different colours. Advantageously the or each light is a LED lights. Advantageously the or each light is capable of being controlled to vary intensity and/or colour.

In embodiments of the invention one or more lights are single colour dimmable lights. In embodiments of the invention one or more lights are multi-colour lights that can be cycled between colours. Embodiments of the invention may comprise combination of single colour and multi-colour lights. Embodiments of the invention may comprise a plurality of lights wherein each light is identical.

The motion detector A marine lighting system according to any preceding claim, in which the or each light has an orientation detector for detecting the orientation of a light relative to a vessel. The orientation detector may be the same as the motion detector of the system or may be separate and additional to the motion detector. For example, in embodiments of the invention the motion detector may be integrated with the controller that is remote, and separate, from the or each light, whilst the or each light may be provided with an orientation detector. An orientation detector should be able to detect the orientation of a light relative to the heave axis of a vessel and may also be able to determine the orientation of a light relative to the surge and/or sway axes of the vessel.

The present invention also provides a method of operating a lighting system according to the present invention. The method comprises the steps of i) assigning a base roll light level for the or each light for when zero roll is detected;

ii) assigning a first roll light level for the or each light for a maximum positive roll and interpolating a roll light level for the or each light for any positive roll between zero and the maximum positive roll;

iii) assigning a second roll light level for the or each light for a maximum negative roll and interpolating a light roll level for the or each light for any negative roll between zero and the maximum negative roll;

iv) controlling the or each light to produce a roll light level according to steps (i) or (iii) based on the roll detected by the motion detector.

As will be readily appreciated, this method is applicable to any system of the present invention in which the roll of the marine vessel is detected.

The present invention also provides a method of operating a lighting system according to the present invention, comprising the steps of:

v) assigning a base pitch light level for the or each light for when zero pitch is detected;

vi) assigning a first pitch light level for the or each light for a maximum positive pitch and interpolating a pitch light level for the or each light for any positive pitch between zero and the maximum positive pitch;

vii) assigning a second pitch light level for the or each light for a maximum negative roll and interpolating a pitch light level for the or each light for any negative roll between zero and the maximum negative pitch;

controlling the or each light to produce a pitch light level according to steps (i) or (iii) based on the pitch detected by the motion detector.

As will be readily appreciated, this method is applicable to any system of the present invention in which the pitch of the marine vessel is detected.

In either method of the invention, a rotational movement of the vessel (either pitch or roll) is detected and the or each light of the system of the invention is controlled to operate based on the detected rotational movement of the vessel. The operation of the or each light is controlled between a base level at which the pitch or roll of the vessel is at zero and a maximum and minimum pitch or roll. The light level that is operated may be intensity, colour, switching the light on and off or any combination thereof.

In embodiments of the invention, the base roll light level and/or the base pitch light level is zero, such that the or each light is controlled to produce no light when no roll and/or pitch is detected. In such embodiments the light level may be controlled such that a maximum light intensity of a specific colour is provided when a maximum magnitude of pitch and/or roll is detected. The interpolation between the zero level and the maximum magnitude of pitch and/or roll may then be such that the intensity of a specific colour increases as the vessel pitches or rolls away from the zero level and then reduces again as the vessel pitches or rolls back towards the zero level.

In embodiments of the invention the interpolation of the light levels may vary the colour of the or each light and the base pitch and/or roll light level is a different colour from the first and second roll or pitch light levels. That is, the lights may be controlled to produce a first colour when the vessel is as zero pitch and/or roll and that colour may be varied to a second colour as the vessel pitches and/or rolls away from zero to a maximum zero and/or pitch level.

In embodiments of the invention the first roll and/or pitch light level is a first colour and the second roll and/or pitch level is a second colour. In methods according to this embodiment the one or more of the lights is controlled to produce a light of a first colour when the vessel pitches or rolls in a first pitch or roll direction and one or more of the lights is controlled to produce a light of a second (different) colour when the vessel pitches or rolls in a second pitch or roll direction. This can be done with two or more monochromatic lights of different colours such that each light is only controlled to operate when the vessel pitches or rolls in either the first or second pitch or roll direction. Alternatively or additionally this embodiment can be one or more polychromatic lights.

The interpolation of the method of the present invention may be a linear interpolation or any other suitable interpolation.

In methods according to the present invention it may be advantageous that, as an initial step, the orientation of the or each light relative to the surge, sway, and heave axes of the marine vessel prior to any other steps of the invention. This is advantageous as it ensures that the or each light may be operated properly when motion of the vessel is detected.

The system and the method of the present invention control the illumination of one or more lights when a vessel pitches and/or rolls. In addition, the system and method of the present invention may further control the illumination of one or more lights when any other motion of the vessel is detected, for example when surge, sway, heave, or yaw of the vessel is detected. In addition or as an alternative the illumination of the lights may also be controlled independent of the motion of the vessel, for example according to preset patterns or by manual control.

Further features and advantages of the present invention will be apparent from the preferred embodiment shown in the Figures and described below.

DETAILED DESCRIPTION

Figure 1:
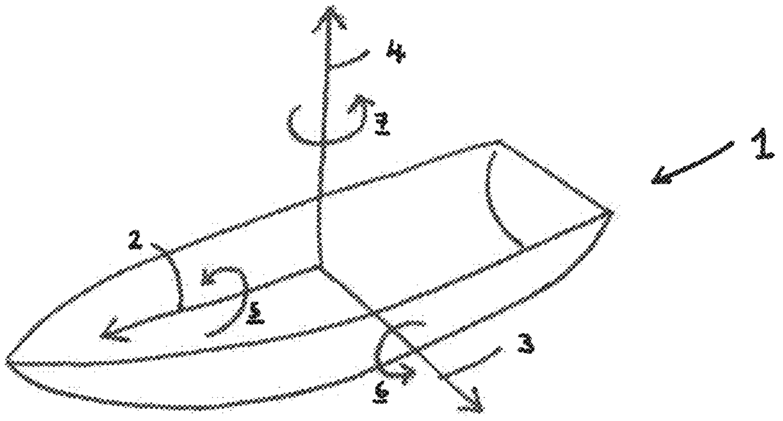
FIG. 1 shows the six degrees of motion of a typical marine vessel.

FIG. 1 shows a marine vessel 1 and the six degrees of motion. As will be well understood, the marine vessel can move in six degrees of motion, each illustrated in FIG. 1. The six degrees of motion are:

Surge 2
Sway 3
Heave 4
Roll 5
Pitch 6
Yaw 7

Each of surge 2, sway 3, and heave 4 are linear motion, whilst each of roll 5, pitch 6, and yaw 7 are rotational motion.

Figure 2:
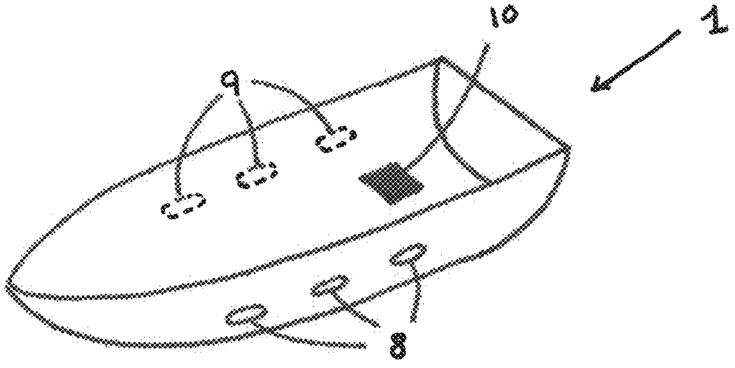
FIG. 2 shows a light system of the present invention.

FIG. 2 shows a light system according to the method of the present invention. The system comprises three underwater lights 8 mounted on the port side of a hull of a marine vessel 1, three underwater lights 9 mounted on a starboard side of a hull of the marine vessel 1, and a controller 10 mounted within the marine vessel. The controller 10 is in communication with each of the underwater lights 8, 9. Each underwater light 8, 9 is multi-colour LED light and contains an accelerometer that can detect the motion of the vessel 1 along about each of the surge, sway, and heave axes 2, 3, 4 and that can be used to determine the orientation of the underwater light.

The system of the present invention operates in the following manner. When the underwater lights 8, 9 are installed in the marine vessel 1 their orientation relative to the vessel 1 is determined and this information is input into and stored within the controller 10. Each underwater light 8, 9 is in communication with the controller 10 either by a wired or a wireless connection. When the vessel 1 is at sea the accelerometer of each underwater light 8, 9 communicates with the controller to determine whether the vessel is pitching or rolling.

At a zero level or pitch or roll the underwater lights are controlled to be off. When the vessel rolls away from zero level in a positive direction the underwater lights 8, 9 are controlled to be illuminated in a first colour, for example red. When the vessel rolls away from the zero level in a negative direction the underwater lights 8, 9 are controlled to be illuminated in a second colour, for example green.

The intensity of the illumination is controlled based on the amount by which the vessel rolls away from the zero level between zero illumination at the zero level and a maximum level at a predetermined maximum pitch or roll level. The intensity of illumination between the zero level and the maximum level is linearly interpolated such that the illumination linearly increases as the vessel rolls away from the zero level and linearly decreases as the vessel rolls towards the zero level.

The colour and/or intensity may also be controlled in the same manner as the vessel pitches to and from the zero level.

The controller may also vary the colour and intensity of the illumination of the lights based on other criteria. For example, the controller may illuminate the lights based on a predefined illumination pattern or on the basis of user input. For example, a user may choose to disable or enable the control of the lights on the basis of the roll and/or pitch of the vessel.

Unless otherwise indicated by the claims or the description any feature of the present invention may be included in an embodiment of the present invention independently of any other feature.

The invention claimed is:

1. A method of operating a marine vessel lighting system, comprising the steps of:

i) assigning a base roll light level for at least one light capable of being controlled to vary intensity and/or colour in the marine vessel lighting system for when zero roll is detected by a motion detector operable to detect roll of a vessel in which the marine vessel lighting system is mounted, wherein the at least one light comprises an underwater light or an external light, wherein operation of the at least one light is controlled by a controller on the basis of roll of the vessel detected by the motion detector such that the colour and/or intensity of the at least one light is varied on the basis of the roll of the vessel detected by the motion detector;

ii) assigning a first roll light level for the at least one light for a maximum positive roll and interpolating a roll light level for the at least one light for any positive roll between zero and the maximum positive roll;

iii) assigning a second roll light level for the at least one light for a maximum negative roll and interpolating a roll light level for the at least one light for any negative roll between zero and the maximum negative roll; and iv) controlling, using the controller, the at least one light to produce a roll light level according to steps (i) or (iii) based on the roll of the vessel detected by the motion detector.

2. A method according to claim 1, wherein the base roll light level is zero, such that the at least one light is controlled to produce no light when no roll is detected.

3. A method according to claim 1, wherein the interpolation of the roll light levels is an interpolation of intensity between a minimum at the base roll light levels and a maximum at any of the first or second roll light levels.

4. A method according to claim 1, wherein the interpolation of the roll light levels varies the colour of the at least one light and the base roll light level is a different colour from the first and second roll light levels.

5. A method according to claim 1, wherein the first roll light level is a first colour and the second roll light level is a second colour.

6. A method according to claim 1, wherein the interpolation is a linear interpolation.

7. A method according to claim 1, further comprising the step of determining an orientation of the at least one light relative to the axes of the surge, sway, and heave of the marine vessel prior to steps (i) to (iii).

8. A method of operating a marine vessel lighting system, comprising the steps of:

i) assigning a base pitch light level for at least one light capable of being controlled to vary intensity and/or colour in the marine vessel lighting system for when zero pitch is detected by a motion detector operable to detect pitch of a vessel in which the marine vessel lighting system is mounted, wherein the at least one light comprises an underwater light or an external light, wherein operation of the at least one light is controlled by a controller on the basis of pitch of the vessel detected by the motion detector such that the colour and/or intensity of the at least one light is varied on the basis of the pitch of the vessel detected by the motion detector;

ii) assigning a first pitch light level for the at least one light for a maximum positive pitch and interpolating a pitch light level for the at least one light for any positive pitch between zero and the maximum positive pitch;

iii) assigning a second pitch light level for the at least one light for a maximum negative pitch and interpolating a pitch light level for the at least one light for any negative pitch between zero and the maximum negative pitch; and iv) controlling, using the controller, the at least one light to produce a pitch light level according to steps (i) or (iii) based on the pitch of the vessel detected by the motion detector.

9. A method according to claim 8, wherein the base pitch light level is zero, such that the at least one light is controlled to produce no light when no pitch is detected.

10. A method according to claim 8, wherein the interpolation of the pitch light levels is an interpolation of intensity between a minimum at the base pitch light levels and a maximum at any of the first or second pitch light levels.

11. A method according to claim 8, wherein the interpolation of the pitch light levels varies the colour of the at least one light and the base pitch light level is a different colour from the first and second pitch light levels.

12. A method according to claim 8, wherein the first pitch light level is a first colour and the second pitch light level is a second colour.

13. A method according to claim 8, wherein the interpolation is a linear interpolation.

14. A method according to claim 8, further comprising the step of determining an orientation of the at least one light relative to the axes of the surge, sway, and heave of the marine vessel prior to steps (i) to (iii).

* * * * *